R. T. WRIGHT.
TOBACCO PIPE.
APPLICATION FILED MAR. 8, 1920.
1,401,226. Patented Dec. 27, 1921.
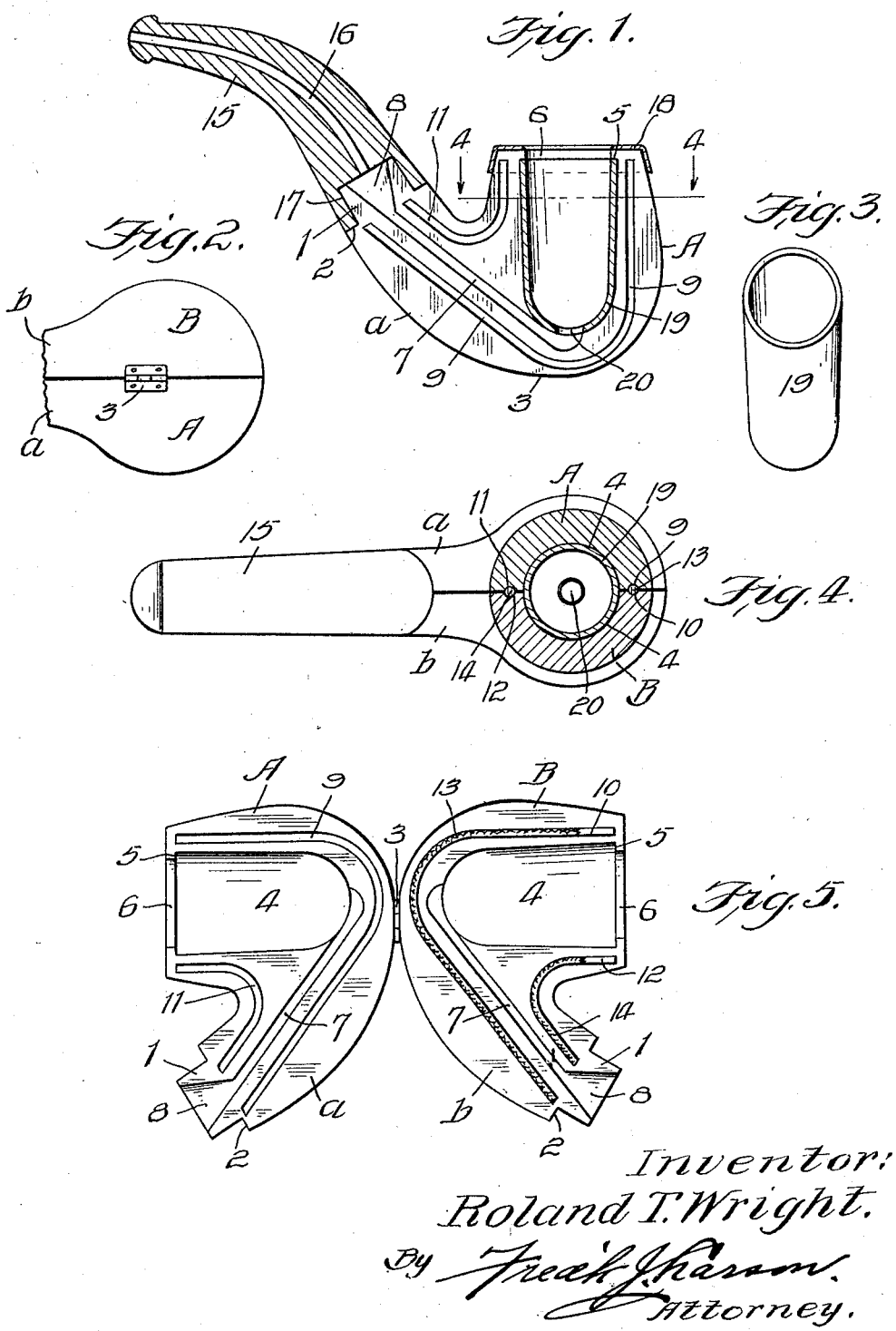

UNITED STATES PATENT OFFICE.

ROLAND T. WRIGHT, OF ST. LOUIS, MISSOURI, ASSIGNOR OF ONE-HALF TO JOHN H. BUNCHER, OF ST. LOUIS, MISSOURI.

TOBACCO-PIPE.

1,401,226.  Specification of Letters Patent.  Patented Dec. 27, 1921.

Application filed March 8, 1920.  Serial No. 364,329.

*To all whom it may concern:*

Be it known that I, ROLAND T. WRIGHT, a citizen of the United States, residing in the city of St. Louis and State of Missouri, have invented certain new and useful Improvements in Tobacco-Pipes, of which the following is a specification.

My invention relates to improvements in tobacco pipes and has for its object to provide a pipe, the bowl of which is formed of two like sections, hingedly united.

A further object of the invention is to provide each of the bowl sections with a continuous groove on opposite sides of the cavity of the bowl section and the smoke passage of the integral stem section thereof and to provide the grooves of one of the bowl sections with a cork or suitable yieldable filler to seal the joint between the bowl sections when in their closed position.

A still further object of the invention is to provide the stem sections of the bowl with a reduced end to be received in the end of a suitable pipe stem to assist in holding the bowl sections in their closed position.

A still further object of the invention is to form the cavity of the bowl sections with a flange at the upper end thereof to retain a filler bowl in the cavity formed by the bowl sections of the pipe.

A still further object of the invention is to provide a removable ring like crown member to fit over the top of the bowl sections when in their closed position to assist the stem and hinge in holding the bowl sections in their closed position.

With the above and other objects in view, the invention consists in the novel features of construction, arrangement and combination of parts hereinafter described and finally pointed out in the claim hereto appended.

Referring to the drawings forming a part of this specification wherein like characters of reference denote similar parts throughout the several views:

Figure 1, is a view showing one of the bowl sections with the pipe stem attached thereto.

Fig. 2, is a fragmentary view showing the hinge member fixed to the bottom of the bowl sections.

Fig. 3, is a perspective view of the filler bowl.

Fig. 4, is a view taken on line 4—4 of Fig. 1.

Fig. 5, is a view showing the two bowl sections in their open position.

In carrying out the aim of my present invention, I employ two like bowl sections, or halves A and B provided with the integral stem sections *a* and *b*, respectively. The end of each integral stem section *a* and *b* of the bowl sections A and B are reduced, as at 1, to form the stop or shoulder 2. The two bowl sections, or halves A and B are united at their base by means of a suitable hinge 3.

The bowl sections A and B are each provided with a cavity 4 and the upper end of each cavity is provided with a shoulder 5 to form a passage 6 which is of less diameter than the bowl cavities, as clearly shown in Fig. 5, and of less diameter than the cavity formed when the bowl sections are in their closed position.

7 indicates a suitable smoke passage extending from the base of each bowl section cavity 4 through the integral stem sections *a* and *b* and terminating at the reduced ends 1 of the stem sections *a* and *b* in an enlarged or tapered cavity 8.

The bowl sections A and B, including the integral stem sections *a* and *b* thereof, are provided in their flat faces with like grooves 9 and 10, respectively, which are formed on one side of the bowl cavities 4 and the smoke passage 7, and with the like grooves 11 and 12, respectively, which are formed on the opposite side of the bowl cavities 4 and smoke passage 7. The grooves on the flat face of the bowl section B and integral stem section *b* thereof, are provided with a cork, or similar yieldable packing tongues 13 and 14, respectively. The packing tongues 13 and 14 are, preferably, circular in cross-section, and only half of each packing tongue 13 and 14 is receivable in its respective groove. This arrangement permits the remaining half of each packing tongue 13 and 14 to extend above the flat face of the bowl section B and its integral stem section *b*, so that when the bowl sections, or halves A and B are closed that the extending portions or each packing tongue 13 and 14 will be received by the grooves 9 and 11, respectively, in the flat face of the bowl section A and the integral stem section *a* thereof. These packing tongues 13 and 14 tend to form concealed seals for providing air tight joints on opposite sides of the bowl cavity and the smoke passage of the integral stem section when the bowl sections, or halves A and B are in their closed position, as shown in Fig. 4.

15 indicates the removable pipe stem having the smoke passage 16 which terminates at one end in the socket 17. The reduced end 1 of the stem sections *a* and *b* is receivable in the socket 8 of the removable pipe stem 15, thus it will be seen that the socket end of the stem serves the purpose of holding the stem ends of the bowl sections firmly together when the bowl sections are in their closed position, as shown in Figs. 1 and 4.

18 indicates a removable angular rink like member which is mounted upon the upper end of the bowl sections when in their closed position and serves to hold the bowl sections in their closed position and prevent spreading thereof.

19 indicates a suitable open top tobacco bowl having the smoke passage 20 in its lower end. The bowl 19 is receivable in the cavities 4 of the bowl sections and is held from falling out, when the bowl sections are closed, by means of the shoulders 5.

It is, of course, understood that tobacco can, when desired, be placed directly into the cavity 4 of the bowl when the bowl sections are closed instead of first placing the removable bowl 19 in the bowl cavities 4 and then placing the tobacco in the bowl 19. Equally as good smoking results can be obtained by omitting the removable tobacco bowl 19 as can be had by using the same.

The many advantages of the herein described invention will readily suggest themselves to those skilled in the art to which it appertains.

I do not wish to be understood as having limited myself to the details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes or modifications as may fairly fall within the scope of the appended claim when fairly construed.

What I claim is:

In combination with a removable pipe stem having a smoke passage and a socket formed at one end thereof, a pipe bowl comprising halves provided with cavities hingedly united at their base, a bowl stem section having a smoke passage communicating at one end with the bowl cavity, a reduced bowl stem section receivable in the socket of the removable pipe stem, a removable tobacco bowl receivable in the pipe bowl cavities, a shoulder formed at the upper end of the bowl halves to retain the removable tobacco bowl in position when the bowl halves are in their closed position, yieldable packing strips interposed between the pipe bowl halves and integral stem sections thereof, and a retaining ring removably mounted upon the upper end of the pipe bowl halves to assist the socket end of the pipe stem to retain the pipe bowl halves in their closed position.

In testimony whereof, I have hereunto signed my name to the specification.

ROLAND T. WRIGHT.